United States Patent
Loyer et al.

(10) Patent No.: US 6,266,715 B1
(45) Date of Patent: Jul. 24, 2001

(54) UNIVERSAL SERIAL BUS CONTROLLER WITH A DIRECT MEMORY ACCESS MODE

(75) Inventors: Bruce A. Loyer, Austin; Daniel B. Reents, Dripping Springs, both of TX (US); Allen B. Thor, Livingston, NJ (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/088,346

(22) Filed: Jun. 1, 1998

(51) Int. Cl.[7] .............................. G06F 13/00; G06F 3/00
(52) U.S. Cl. ............................ 710/22; 710/9; 710/21; 710/22; 710/53; 710/57; 709/212; 709/234
(58) Field of Search .................................... 710/9, 21, 22, 710/27, 8, 53, 57; 709/212, 234

(56) References Cited

U.S. PATENT DOCUMENTS

| 4,823,312 | 4/1989 | Michael et al. ......................... 710/71 |
| 4,878,166 | * 10/1989 | Johnson et al. ....................... 710/128 |
| 5,003,465 | * 3/1991 | Chisholm et al. ....................... 710/25 |
| 5,140,679 | 8/1992 | Michael ................................. 710/106 |
| 5,199,105 | 3/1993 | Michael ................................. 710/22 |
| 5,228,130 | 7/1993 | Michael ................................. 710/8 |
| 5,241,660 | 8/1993 | Michael et al. ....................... 709/234 |
| 5,287,458 | 2/1994 | Michael et al. ........................ 710/38 |

(List continued on next page.)

FOREIGN PATENT DOCUMENTS

| 0442615 A2 | 8/1991 | (EP) . |
| 0803821 A2 | 10/1997 | (EP) . |

OTHER PUBLICATIONS

*8x930Ax Universal Serial Bus Microcontroller*, Intel Corporation, Feb. 1997, pp. iii–iv and 1–34.
*Am186™ED/EDLV Microcontrollers User's Manual*, Advanced Micro Devices, Inc. © 1997,, Chapter 9, pp. 1–14.
*Universal Host Controller Interface(UHCI) Design Guide*, Intel Corporation, Mar. 1996, pp. iii–vi and 1–41, Rev. 1.1.
*8x930Ax, 8x930Hx Universal Serial Bus Microcontroller User's Manual*, Intel Corporation, pp. iii–xix, pp. 1–9, Chapter 1 and pp. 1–17, Chapter 2.

(List continued on next page.)

Primary Examiner—Thomas Lee
Assistant Examiner—Tammara Peyton
(74) Attorney, Agent, or Firm—Akin, Gump, Strauss, Hauer & Feld, L.L.P.

(57) ABSTRACT

A universal serial bus (USB) device or host provides a universal serial bus (USB) controller with a direct memory access (DMA) mode. In a DMA mode, a universal serial bus (USB) transmit endpoint may be programmed for a direct memory access (DMA) transmit channel, or a universal serial bus (USB) receive endpoint may be programmed for a direct memory access (DMA) receive channel. For a USB device, a DMA transmit channel performs data transfer to a universal serial bus (USB) host, and a DMA receive channel handles data transfer from the USB host. For a USB host, a DMA transmit channel performs data transfer to the USB device, and a DMA receive channel handles data transfer from the USB device. A universal serial bus transmit protocol and a universal serial bus receive protocol for the DMA mode of the USB controller permit a maximum packet size of universal serial bus (USB) data to be programmed to a value greater than the physical size of a USB transmit or receive buffer of a USB transmit or receive endpoint. A USB controller with a DMA mode thus allows for a significant reduction in the buffer size of a USB transmit or receive buffer. A USB device having a controller with a DMA mode handles USB data as fast as the USB host can request USB data.

41 Claims, 7 Drawing Sheets

U.S. PATENT DOCUMENTS

| | | | |
|---|---|---|---|
| 5,655,151 | | 8/1997 | Bowes et al. .............................. 710/1 |
| 5,774,744 | * | 6/1998 | Story et al. ............................. 710/27 |
| 5,845,151 | | 12/1998 | Story et al. ............................. 710/27 |
| 5,890,012 | * | 3/1999 | Poisner .................................... 710/22 |
| 5,951,667 | * | 9/1999 | Abramson ............................ 710/129 |
| 5,974,486 | * | 10/1999 | Siddappa .............................. 710/53 |
| 5,996,031 | * | 11/1999 | Lim et al. .............................. 710/52 |
| 6,070,208 | * | 5/2000 | Brief .................................... 710/104 |
| 6,073,205 | * | 6/2000 | Thomson ............................. 711/100 |

OTHER PUBLICATIONS

OKI Semiconductor, MSM60851, USB Device Controller, p. 1–42, Mar., 1998, Jul., 1998.*

*Das USB Protokoll*, by Von Wolfgang Schulte, Funkschau, Nov. 1998, pp. 42–44.

*International Search Report*, PCT/US99/04611, Jun. 29, 1999, 2 pp.

Compaq et al., Universal Serial Bus Specification, Revision 1.0, pp. 1–60 (Jan. 15, 1996).

* cited by examiner

| DSEL | DMA REQUEST SOURCE/SYNCHRONIZATION |
|---|---|
| 11000 | USB ENDPOINT A RECEIVER, SOURCE SYNCHRONIZATION |
| 11001 | USB ENDPOINT A TRANSMITTER, DESTINATION SYNCHRONIZATION |
| 11010 | USB ENDPOINT B RECEIVER, SOURCE SYNCHRONIZATION |
| 11011 | USB ENDPOINT B TRANSMITTER, DESTINATION SYNCHRONIZATION |
| 11100 | USB ENDPOINT C RECEIVER, SOURCE SYNCHRONIZATION |
| 11101 | USB ENDPOINT C TRANSMITTER, DESTINATION SYNCHRONIZATION |
| 11110 | USB ENDPOINT D RECEIVER, SOURCE SYNCHRONIZATION |
| 11111 | USB ENDPOINT D TRANSMITTER, DESTINATION SYNCHRONIZATION |

UNIVERSAL SERIAL BUS CONTROLLER WITH A DIRECT MEMORY ACCESS MODE

BACKGROUND OF THE INVENTION

1. Field of the Invention

The present invention relates to microcontrollers and more particularly, to a universal serial bus (USB) controller with a direct memory access (DMA) mode.

2. Description of the Related Art

Microcontrollers

As technology advances, computer system components are providing specific services which previously were offered by a microprocessor or the computer system as a whole. A centerpiece of this advancing technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or Am186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. An execution unit should be free to perform the programmed task to which it is dedicated, rather than spending time waiting on other units within the microcontroller.

Direct Memory Access

Often helpful in freeing up the execution unit are direct memory access (DMA) units, timer control units, and interrupt control units. Such units off-load the tasks of waiting for certain external transactions to take place, and, in the case of the DMA unit, actually off-loading the task itself. The DMA unit can be programmed to perform transfers between memory locations, or between memory locations and an input/output port. Off-loading these tasks, the execution unit is freed from having to wait for such transfers to take place, and as such, can increase the overall speed of the computer system.

The DMA unit functions, without involving the microprocessor, by initializing control registers in the DMA unit with transfer control information. The transfer control information generally includes the source address (the address of the beginning of the block of data to be transferred), the destination address (the address where the beginning of the block of data is to be transferred), and the size of the data block. Unlike the microprocessor which stores the data internally before distributing the data to the proper address, the DMA unit provides address and bus control signals to and from a peripheral device such that the peripheral device can access memory directly for a read or a write cycle.

Specific channels are implemented in a DMA unit to allow peripheral devices to transfer data directly to or from other peripheral devices or memory devices. A channel can be activated via a DMA request signal (DREQ) from a peripheral device or memory device. The DMA unit receives the DREQ, provides a DMA acknowledge signal (DACK), and transfers the data over the channel to or from the peripheral device or memory device. Peripheral devices which commonly use DMA channels include DRAM (dynamic RAM) refresh circuitry, sound cards, SCSI host adapters, parallel ports, tape cards, network cards, modems, and floppy disk controllers.

Universal Serial Bus

Turning now to the communications side of the embedded systems industry, specialized microcontrollers with integrated communication features are becoming particularly attractive for communications applications. A microcontroller, or an embedded controller, is uniquely suited to combining functionality onto one monolithic semiconductor substrate (i.e., chip). By embedding various communication features within a single chip, a communications microcontroller may support a wide range of communication applications.

An important component of a communications microcontroller has been a Universal Serial Bus (USB) controller. The Universal Serial Bus is a serial bus standard that implements a communication architecture and interface to allow for the connection of multiple peripherals through a single port while also providing digital telephony capabilities. A Universal Serial Bus is used to connect a USB device with a USB host. For example, a Universal Serial Bus may connect a microcontroller (i.e., USB device) to a computer system (i.e., USB host). Each USB device is composed of a collection of independently operating endpoints. An endpoint, which is the ultimate consumer or provider of data, is a uniquely identifiable portion of a USB device that is the terminus of a communication flow between the USB host and the USB device.

A few characteristics which define the operation of an endpoint include the transfer type for an endpoint, the direction data is transferred between an endpoint and a host, and the maximum packet size (MaxPacketSize) that an endpoint is capable of sending or receiving. An endpoint must transmit data payloads with a data field less than or equal to MaxPacketSize.

One type of data transfer supported by USB architecture is isochronous data transfer. Isochronous data is continuous and real-time in creation, delivery, and consumption. Isochronous data must be delivered at the rate at which the isochronous data is received. For an isochronous pipe, USB limits the maximum packet size (i.e., maximum data payload size) to 1023 bytes. Details concerning isochronous data transfer with USB devices and other aspects of a Universal Serial Bus are provided by the Universal Serial Bus Specification, Revision 1.0, Jan. 15, 1996, Compaq Computer Corporation, Digital Equipment Corporation, IBM PC Company, Intel Corporation, Microsoft Corporation, NEC, Northern Telecom.

The Universal Serial Bus Specification specifies that USB devices are required to supply some buffering of data. Buffers provided by a USB endpoint provide space for data to accumulate until it is time for the USB data to move over a Universal Serial Bus. Buffering was intended by the originators of USB to provide a source and destination for USB data. Accordingly, the conventional use of a USB buffer (e.g., FIFO) has been to place a packet of data in the buffer, wait for a request for that data and then remove the packet of data from the buffer.

So far as is known, conventional USB controllers have not allowed for reception of back to back USB packets. For example, in the case of a USB host with data to provide to a USB device, the USB host fills up the USB buffer of the USB device. Additional requests by the host to provide data cannot be handled unless multiple USB buffers are supported by the USB device. Even with multiple USB buffers, however, eventually a request by the host to provide data cannot be handled.

SUMMARY OF THE INVENTION

Briefly, the present invention provides a universal serial bus (USB) device or host having a universal serial bus (USB) controller with a direct memory access (DMA) mode. In a DMA mode, a universal serial bus (USB) transmit endpoint of the USB controller may be programmed for a direct memory access (DMA) transmit channel, or a universal serial bus (USB) receive endpoint of the USB controller may be programmed for a direct memory access (DMA) receive channel. For a USB device, a DMA transmit channel performs data transfer to a universal serial bus (USB) host, and a DMA receive channel performs data transfer from the USB host. The USB device may for example be a microcontroller. For a USB host, a DMA transmit channel performs data transfer from the host, and a DMA receive channel performs data transfer from the USB device. The USB host may for example be a computer system.

The present invention further provides a universal serial bus (USB) receive protocol and a universal serial bus (USB) transmit protocol for a DMA mode of the USB controller. The USB receive protocol includes issuing direct memory access requests until a receive buffer of a USB receive endpoint is empty. The USB transmit protocol includes issuing direct memory access requests until a transmit buffer of a USB transmit endpoint is full. The USB transmit protocol and USB receive protocol permit a maximum packet size of USB data to be programmed to a value greater than the physical size of the transmit or receive buffer.

A USB controller with a DMA mode allows for a significant reduction in the buffer size of the transmit and receive buffers. By eliminating buffer size as a restriction on the maximum packet size, a DMA mode of a USB controller permits transmission and reception of back to back USB packets. A USB device having a USB controller with a DMA mode handles data as fast as the USB host can request data.

BRIEF DESCRIPTION OF THE DRAWINGS

A better understanding of the present invention can be obtained from the following detailed description of the preferred embodiment as considered in conjunction with the following drawings, in which.

DETAILED DESCRIPTION OF PREFERRED EMBODIMENT

Related Applications

The following related patent applications are hereby incorporated by reference:

U.S. patent application, Ser. No. 09/088,355, entitled PROGRAMMABLE ENTRY POINTS IN BUFFER DESCRIPTOR RING DIRECT MEMORY ACCESS SYSTEM, filed concurrently, by Bruce A. Loyer, Thai H. Pham, and David A. Spilo.

U.S. patent application, Ser. No. 09/088,478, entitled BUFFER LEVEL INTERRUPT MASKING IN BUFFER DESCRIPTOR RING DIRECT MEMORY ACCESS SYSTEM, filed concurrently, by Thai H. Pham and Patrick E. Maupin.

U.S. patent application, Ser. No. 09/088,200, entitled STAGGERED POLLING OF BUFFER DESCRIPTORS IN A BUFFER DESCRIPTOR RING DIRECT MEMORY ACCESS SYSTEM, filed concurrently, by David A. Spilo.

Figure 1A:
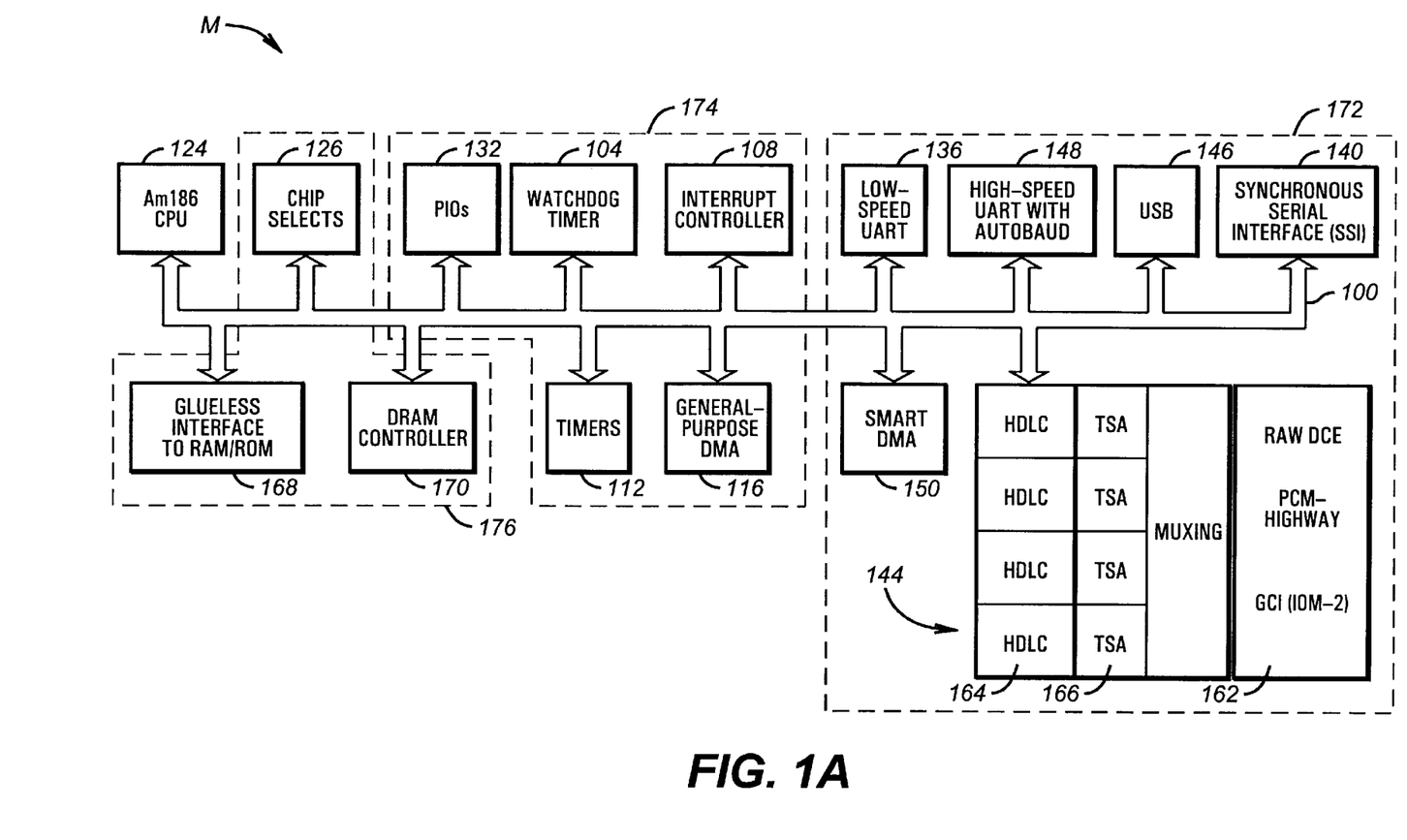
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
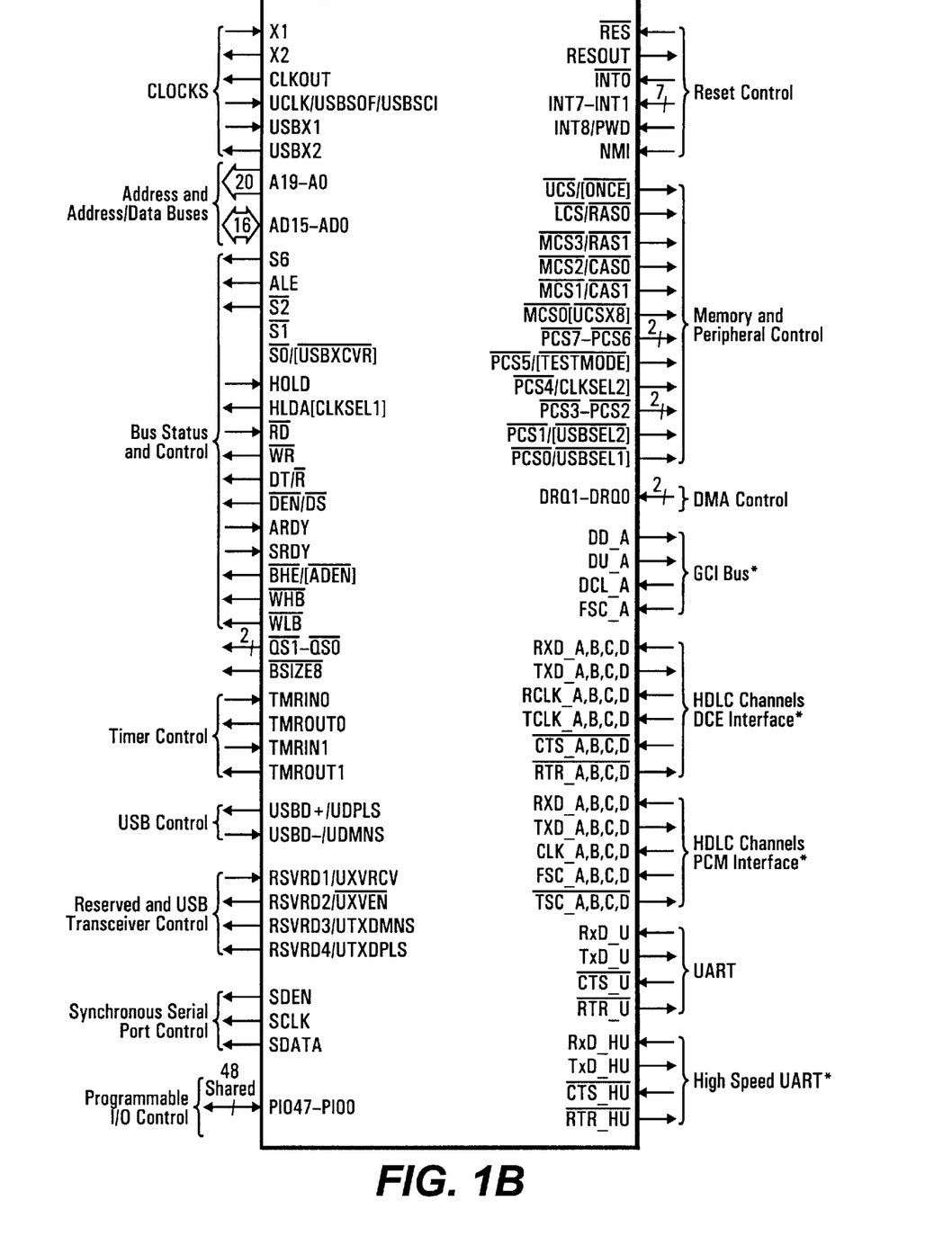
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
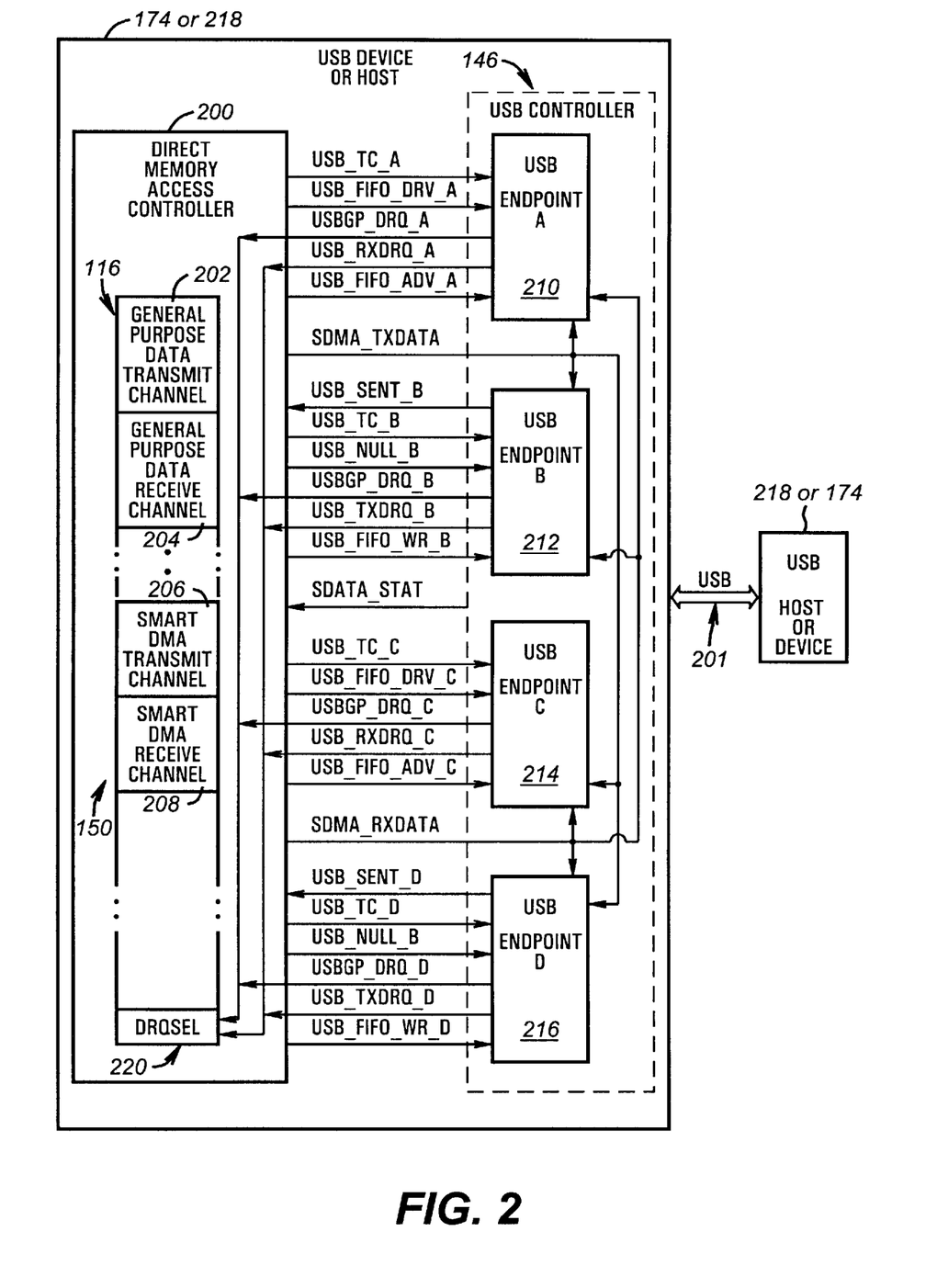
FIG. 2 is a schematic diagram of the microcontroller of FIGS. 1A and 1B or a universal serial bus (USB) host illustrating the signal relationship between a direct memory access (DMA) controller and a universal serial bus (USB) controller with a direct memory access mode in accordance with the present invention.

Referring to FIG. 2, a schematic diagram of a microcontroller 174 (i.e., USB device) or universal serial bus (USB) host 218 (e.g., computer system) illustrating the signal relationship between a direct memory access (DMA) controller 200 and the USB controller 146 with a direct memory access mode is shown. The DMA controller 200 and the USB controller 146 are preferably integrated into the microcontroller 174 or USB host 218. The DMA controller 200 includes a plurality of general purpose DMA channel pairs 116 and a plurality of SmartDMA channel pairs 150. Each general purpose DMA channel pair 116 includes a general purpose DMA transmit channel 202 and a general purpose DMA receive channel 204. Each SmartDMA channel pair 150 includes a SmartDMA transmit channel 206 and a SmartDMA receive channel 208. In a DMA mode of the USB controller 146, a DMA transmit channel 202 or 206 (FIG. 5) handles data transfer from the USB controller 146, or a DMA receive channel 204 or 208 (FIG. 5) handles data transfer to the USB controller 146. If the USB controller 146 is provided in the USB device 174, then the DMA transmit channel 202 or 206 performs data transfer to the USB host 218 during a DMA mode of the USB controller 146, or the DMA receive channel 204 or 208 handles data transfer from the USB host 218 during the DMA mode. If the USB controller 146 is provided in the USB host 218, then the DMA transmit channel 202 or the 206 performs data transfer to the USB device 174 during a DMA mode of the USB controller 146, or the DMA receive channel 204 or 206 handles data transfer from the USB device 174 during the DMA mode. Other typical components of the microcontroller 174 and USB host 218 have been omitted for clarity.

The DMA controller 200 further includes a direct memory access request selector logic block 220 (DRQSEL) for selecting direct memory access request (DRQs) as DRQ sources. The DRQSEL block selects a single DRQ source for each DMA channel to be the active request signal. It should be understood that a DRQ may be multiplexed with other DRQs. Other typical components of the DMA controller 200 have been omitted for clarity.

The USB controller 146 provides a plurality of universal serial bus (USB) endpoints. In the disclosed embodiment, the plurality of USB endpoints include a USB endpoint A 210, a USB endpoint B 212, a USB endpoint C 214, and a USB endpoint D 216. For this particular example, each USB endpoint may serve as either a receive endpoint (i.e., endpoint receiver) or a transmit endpoint (i.e., endpoint transmitter). It should be understood that a single USB endpoint may be configured as an endpoint receiver or alternatively may be configured as an endpoint transmitter. A USB endpoint serves as a source or sink of USB data in communication flow between the USB device 174 and the USB host 218. USB data is moved between the USB host 218 and a USB endpoint 210, 212, 214, or 216 over a universal serial bus 201. Further details concerning USB endpoints, USB hosts, and USB devices are provided by the Universal Serial Bus Specification, Revision 1.0, Jan. 15, 1996, Compaq Computer Corporation, Digital Equipment Corporation, IBM PC Company, Intel Corporation, Microsoft Corporation, NEC, Northern Telecom, which is hereby incorporated by reference as if set forth in its entirety. In accordance with the present invention, a USB endpoint 210, 212, 214, or 216 may be programmed for a DMA channel 202,204,206, or 208. Each USB endpoint is associated with a USB endpoint register (e.g., USB transmit register or USB receive register) or register set 502 or 504 (FIG. 5) for programming the USB endpoint for a particular DMA channel. Other typical components of the USB controller 146 have been omitted for clarity.

In accordance with the present invention, a plurality of signals are provided between the DMA controller 200 and the USB endpoints 210, 212, 214 and 216 of the USB controller 146. A group of general purpose DMA request signals are provided from the USB endpoints 210, 212, 214 and 216 to the DRQSEL block 220. In particular, a USBGP_DRQ_A signal is provided by the USB endpoint A 210; a USBGP_DRQ_B signal is provided by the USB endpoint B 212; a USBGP_DRQ_C signal is provided by the USB endpoint C 214; and a USBGP_DRQ_D signal is provided by the USB endpoint D 216. A group of SmartDMA requests are also provided to the DRQSEL block 220. In particular, a USB_TXDRQ_B signal is provided by the USB endpoint B 212; a USB_TXDRQ_D signal is provided by the USB endpoint D 216; a USB_RXDRQ_A signal is provided by the USB endpoint A 210; and a USB_RXDRQ_C signal is provided by the USB endpoint C 214.

A group of SENT signals are provided to the DMA controller 200. A USB_SENT_B signal is provided from a USB endpoint B 212 for indicating a transmit FIFO (FIG. 3) of the endpoint has sent the last byte of the current frame. A USB_SENT_D signal is provided from a USB endpoint D 216 for indicating a transmit FIFO of the endpoint has sent the last byte of the current frame.

Figure 6:
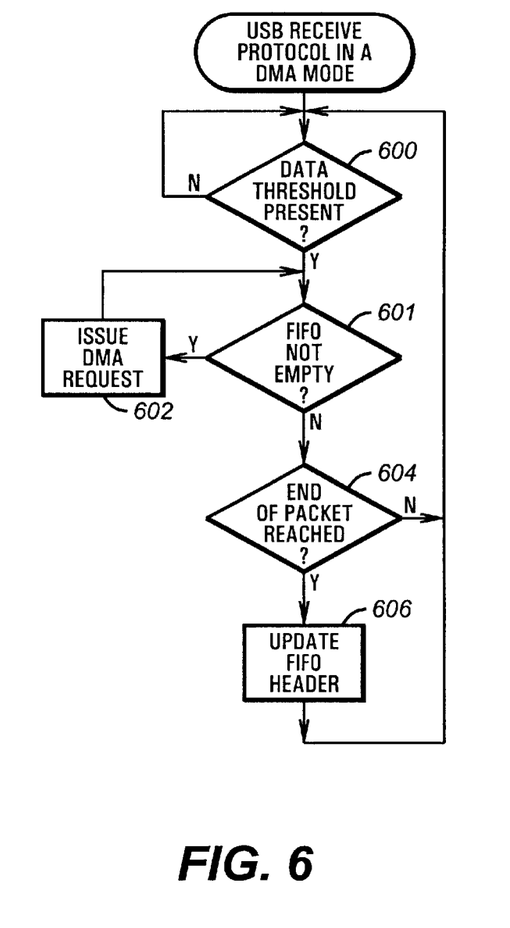
FIG. 6 is a flow chart of the universal serial bus receive protocol for a DMA mode of the USB controller of FIG. 2 in accordance with the present invention.
Figure 7:
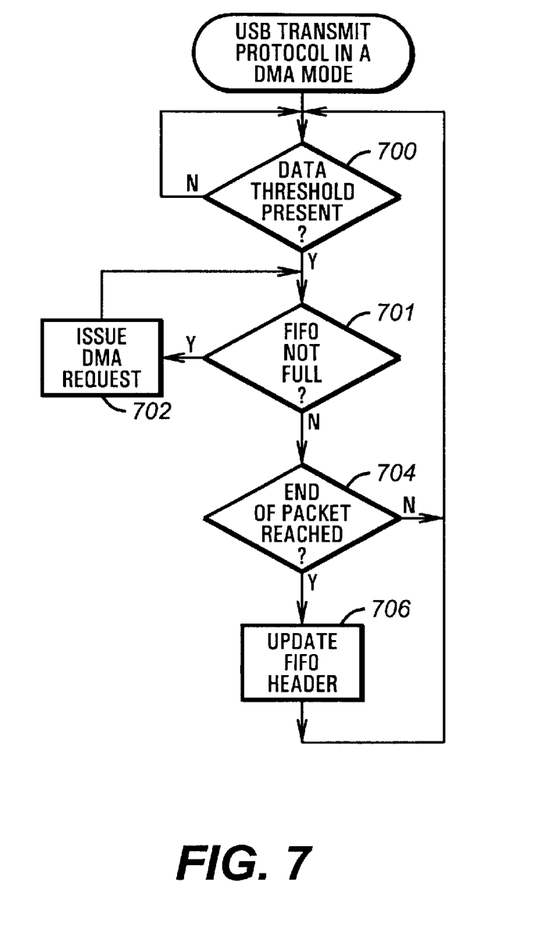
FIG. 7 is a flow chart of a universal serial bus (USB) transmit protocol for a DMA mode of the USB controller of FIG. 2 in accordance with the present invention.

A status signal SDATA_STAT is provided from the USB controller 146 to the DMA controller 200. The SDATA_STAT signal may indicate when a receive transaction as described below in connection with FIG. 6 is complete and may indicate when a transmit transaction as described below in connection with FIG. 7 is complete.

The remaining illustrative signals are provided from the DMA controller 200 to the USB endpoints 210, 212, 214 and 216. A signal SDMA_TXDATA signal provided to each USB endpoint is a transmit data bus for containing request data from a USB host 218 when data transfer is performed using a SmartDMA channel 206 or 208. A SDMA_RXDATA signal also provided to each USB endpoint is a receive data bus for containing data to be written to the USB host 218 from a USB endpoint when performing data transfer by a SmartDMA channel 206 or 208. A USB_FIFO_WR_B signal is provided to the USB endpoint B 212 for indicating valid transmit data is on the transmit data bus SDMA_TXDATA. A USB_FIFO_WR_D signal is provided to a USB endpoint D 216 for indicating valid transmit data is present on the transmit data bus SDMA_TXDATA.

Some additional signals provided by USB endpoints 210, 212, 214, and 216 include driver enable signals and FIFO advance signals. A USB_FIFO_DRV_A signal is provided as a driver enable to the data output from a receive FIFO (FIG. 3) of the USB endpoint A 210. A USB_FIFO_DRV_C signal is a driver enable to the data output from a receive FIFO of the USB endpoint C 214. A USB_FIFO_ADV_A signal provided to the USB endpoint A 210 indicates data from the receive data bus SDMA_RXDATA has been read by a SmartDMA channel 206 or 208. In response to this signal, a receive FIFO of the USB endpoint A 210 advances the FIFO to the next entry. A USB_FIFO_ADV_C signal provided to the USB endpoint C 214 indicates data from the receive data bus SDMA_RXDATA has been read by a SmartDMA channel 206 or 208. In response to this signal, a receive FIFO of the endpoint advances the FIFO to the next entry.

The final group of illustrated signals between the DMA controller 200 and the USB controller 146 includes NULL signals and transfer count signals. A USB_NULL_B signal is provided to the USB endpoint B 212 for indicating that the current packet has 0 data byte. A USB_NULL_D signal provided to the USB endpoint D 216 indicates to the endpoint that the current packet has 0 data byte. A plurality of transfer count signals are applicable when a general purpose DMA channel is used. A USB_TC_A signal indicates to the USB endpoint A 210 that the transfer count has reached 0. A USB_TC_B indicates to the USB endpoint B 212 that its transfer count has reached 0. A USB_TC_C signal indicates to the USB endpoint C 214 that its transfer count has reached 0. A USB_TC_D signal indicates to the USB endpoint D 216 that the transfer count has reached 0.

Figure 3:
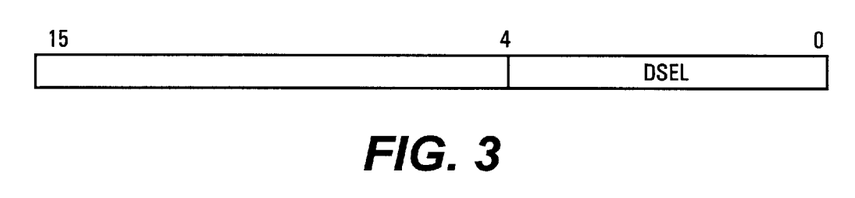
FIG. 3 is an illustration of a direct memory access (DMA) control register of the DMA controller of FIG. 2 having a direct memory access request select field (DSEL)

Referring to FIG. 3, an illustration of a direct memory access (DMA) control register 222 (FIG. 5) is shown. In the disclosed embodiment, the DMA control register 222 includes a DMA request select field (DSEL) for selecting a DMA request source and a synchronization for the DMA channel. Alternatively, the DSEL field may be used exclusively to select a DMA request source. In the disclosed embodiment, a DMA control register is provided for the general purpose DMA channels, and a DMA control register is provided for the SmartDMA channels. For the illustrated example, the DSEL field is defined as the five low order bits of a 16-bit register. It should be understood that the DSEL field may include any number of bits. It should further be understood that the DMA control register 222 may include other fields.

Figure 4:
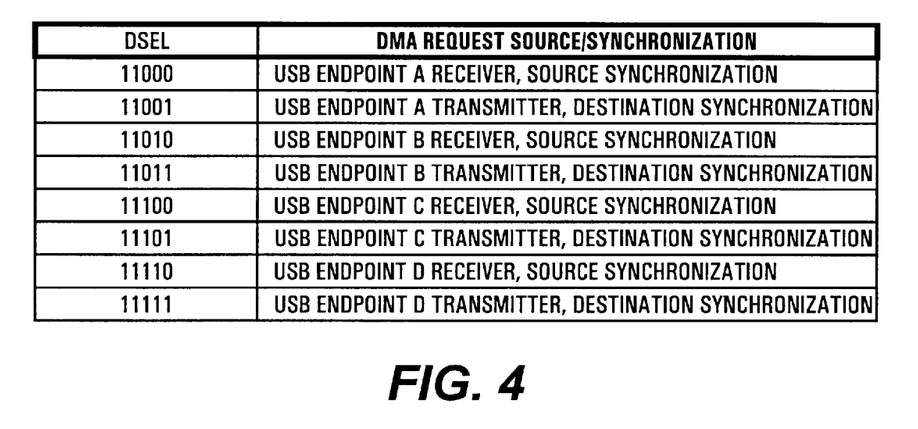
FIG. 4 is a table of exemplary bit combinations for the direct memory access request select field (DSEL) of FIG. 3 for selecting the universal serial bus endpoints of FIG. 2 as direct memory access request sources in accordance with the present invention.

Referring to FIG. 4, a table of exemplary bit combinations for the DSEL field for selecting USB endpoints as DMA request sources is shown. A USB endpoint may be configured as a receiver or a transmitter and may be configured for source or destination synchronization. If the DSEL field is set to "11000", then the USB endpoint A 210 is selected as a DMA request source with a receiver and source synchronization configuration. If the DSEL field is set to "11001", then the USB endpoint A 210 is the DMA request source with a transmitter and destination synchronization configuration. If the DSEL field is set to "11010", then the USB endpoint B 212 is the DMA request source with a receiver and source synchronization configuration. If the DSEL field is set to "11011", then the USB endpoint B 212 is the DMA request source with a transmitter and destination synchronization configuration. If the DSEL field is set to "11100", then the USB endpoint C 214 is the DMA request source with a receiver and source synchronization configuration. If the DSEL field is set to "11101", then the USB endpoint C 214 is the DMA request source with a transmitter and destination synchronization configuration. If the DSEL field is set to "11110", then the USB endpoint D 216 is the DMA request source with a receiver and source synchronization configuration. If the DSEL field is set to "11111", then the USB endpoint D 216 is the DMA request source with a transmitter and destination synchronization configuration.

Figure 5:
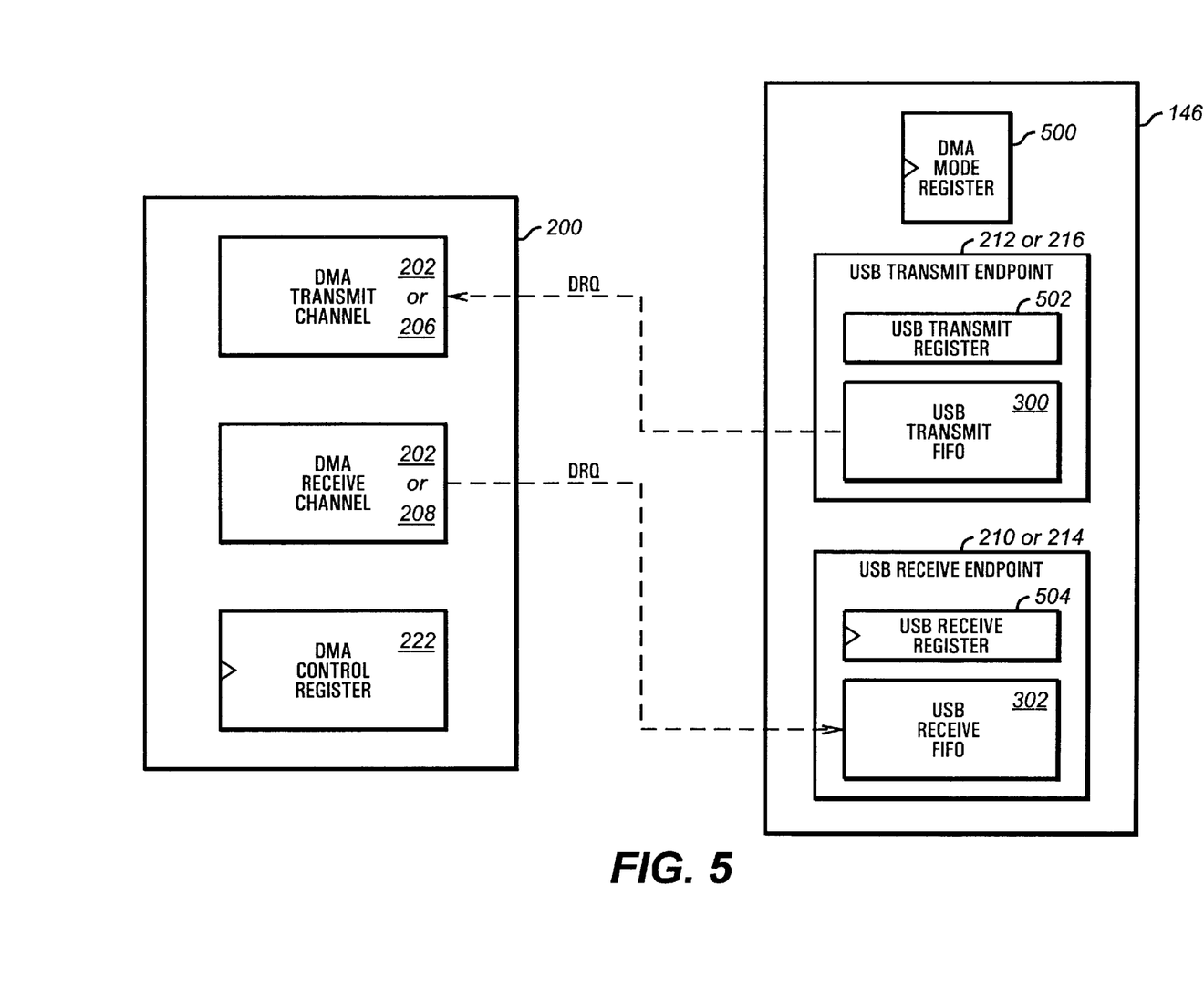
FIG. 5 is a schematic diagram of the USB controller of FIG. 2 including a universal serial bus (USB) transmit FIFO and a universal serial bus (USB) receive FIFO and the DMA controller of FIG. 2 including the DMA control register of FIG. 3, a direct memory access receive channel, and a direct memory access transmit channel in accordance with the present invention.

Each USB endpoint is supported by a FIFO or set of FIFOs. Referring to FIG. 5, the USB transmit endpoint 212 or 216 provides a USB transmit FIFO 300, and a USB receive endpoint 210 or 214 provides a USB receive FIFO 302. A USB FIFO serves as a temporary location for USB data passed between the USB device 74 and the USB host 218. In particular, the USB transmit FIFO 300 stores USB data to be transmitted from the USB controller 146, and the USB receive FIFO 302 stores USB data received by the USB controller 146. In accordance with the present invention, device software is responsible for filling each USB FIFO 300 and 302. In the disclosed embodiment, the USB endpoints 212 and 216 (FIG. 2) may be configured as a transmit endpoint, and the USB endpoints 210 and 214 may be configured as a receive endpoint.

A conventional universal serial bus (USB) controller has provided a polled I/O mode and/or an interrupt-driven I/O mode. In the polled I/O mode, device software actively polls a USB status register (not shown) to determine when a USB device owns a USB FIFO. The device software then must write or read a data port register (not shown) of an endpoint to fill or empty the USB FIFO. For an endpoint to operate in this mode, the maximum packet size must be programmed to be less than or equal to the size of the USB FIFO. The maximum packet size/buffer size restriction has also been necessary for an interrupt-driven I/O mode of a USB controller.

Figure 8:
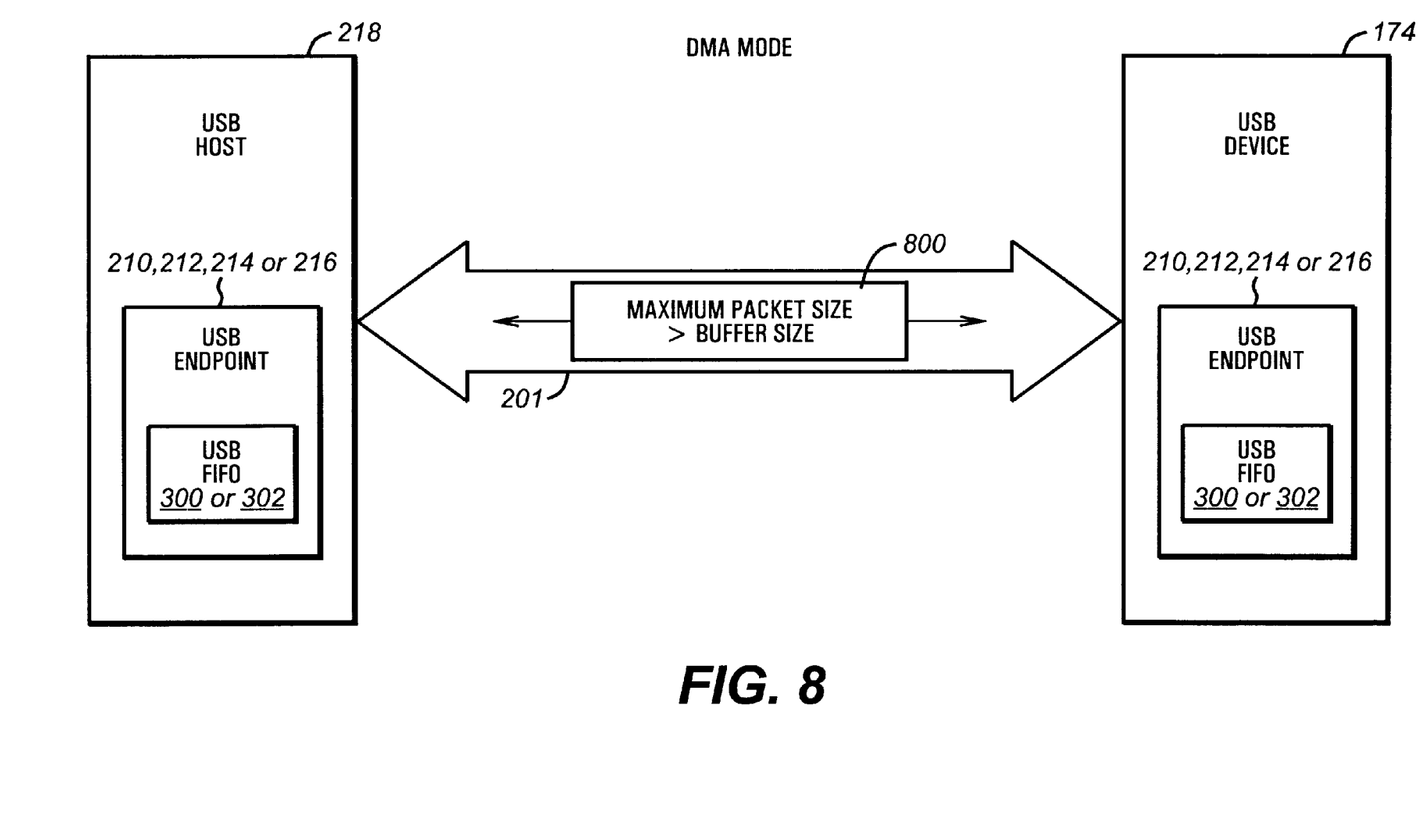
FIG. 8 is a schematic diagram illustrating the relationship between the maximum packet size of a universal serial bus (USB) packet and buffer size achieved by the USB protocols of FIGS. 6 and 7 in accordance with the present invention.

As illustrated in FIG. 8, when the USB controller 146 is operating in a DMA mode in accordance with the present invention, a configured maximum packet size may be larger than the physical FIFO size of a USB endpoint. While there of course is a maximum packet size mandated by the Universal Serial Bus Specification (1023 bytes/packet for isochronous), in accordance with the present invention, packet size is no longer restricted to the size of an endpoint's FIFO.

Another advantage of the universal serial bus controller 146 having a DMA mode is improved throughput. While a polled I/O mode and an interrupt-driven I/O mode of a universal serial bus controller have involved polling to determine when an endpoint needs servicing, in accordance with the present invention, the USB device 174 is ready to receive or transmit data whenever the USB host 218 requests such a transfer. Since the USB controller 146 in a DMA mode does not repeatedly attempt data transfer with a USB device 174 in accordance with the present invention, overhead for the USB bus 201 is significantly reduced.

The USB controller provides a DMA mode register 500 (FIG. 5) or similar mechanism for enabling and disabling a DMA mode of the USB controller 146. The DMA mode for the USB controller 146 may be a general purpose DMA mode or a SmartDMA mode. In a general purpose DMA mode, a general purpose DMA channel 202 or 204 serves as the transfer mechanism for USB data. In a SmartDMA mode, the SmartDMA channel 206 or 208 serves as the transfer mechanism for USB data. Details concerning use and operation of a SmartDMA channel are provided in previously incorporated U.S. patent applications entitled PROGRAMMABLE ENTRY POINTS IN BUFFER DESCRIPTOR RING DIRECT MEMORY ACCESS SYSTEM; BUFFER LEVEL INTERRUPT MASKING IN BUFFER DESCRIPTOR RING DIRECT MEMORY ACCESS SYSTEM; and STAGGERED POLLING OF BUFFER DESCRIPTORS IN A BUFFER DESCRIPTOR RING DIRECT MEMORY ACCESS SYSTEM. It should be understood that a mode which is a superset of a DMA mode may also be considered a DMA mode. For example, it is contemplated that the USB controller 146 may be placed in a mode in which both DMA operations and polling operations are possible.

Referring to FIG. 6, a flow chart of a universal serial bus (USB) receive protocol for a DMA mode of the universal serial bus controller 146 is shown. The USB receive protocol applies to communication between the DMA receive channel 204 or 208 and the USB receive endpoint 210 and 214 (FIG. 5). A USB endpoint may be associated with a particular DMA channel or multiple DMA channels. Beginning at step 600, it is determined if a predetermined threshold amount of USB data is present in the USB receive FIFO 302. If so, control proceeds to step 601. If not, control remains at step 600. Next, at step 601, the USB controller 146 determines if the USB receive FIFO 302 is not empty. If the USB receive FIFO 302 is not empty, then control proceeds to step 602 where the USB controller 146 issues a DMA request (DRQ). From step 602, control returns to step 601. If it is again determined that the USB receive FIFO 302 is not empty in step 601, then control again proceeds to step 602 where the USB controller 146 issues another DMA request. In effect, the USB receive FIFO 302 operates in a circular fashion as long as the USB receive FIFO 302 is not empty. If it is determined that the USB receive FIFO 302 is empty in step 601, then control proceeds to step 604. In step 604, it is detected whether the end of a USB packet has been reached. If so, then control proceeds to step 606. In step 606, a header of the USB receive FIFO 302 is updated to reflect the status of the current USB packet before proceeding to the next USB packet. Due to the high speed nature of this operation, the update operation is performed even before the USB host 218 or USB device 74, whichever applicable, may provide another request. From step 606, control returns to step 600. If it is determined in step 604 that the end of a USB packet has not been reached, then control returns to step 600.

Referring to FIG. 7, a flow chart of universal serial bus (USB) transmit protocol for a DMA mode of the universal serial bus controller 146 is shown. The USB transmit protocol applies to the DMA transmit channel 202 or 206 and the USB transmit endpoint 212 or 216 (FIG. 5). Beginning at step 700, it is determined if a predetermined threshold amount of USB data is present in the USB transmit FIFO 300. If so, control proceeds to step 701. If not, control remains at step 700. Next, in step 701, the USB controller 146 determines if the USB transmit FIFO 300 is not full. If the USB transmit FIFO 300 is not full, then control proceeds to step 702 where the USB controller 146 issues a DMA request (DRQ) as illustrated in FIG. 5. From step 702, control returns to step 701. If it is again determined that the USB transmit FIFO 300 is not full in step 701, then control again proceeds to step 702 where the USB controller 146 issues another DMA request. In effect, the USB transmit FIFO 300 operates in a circular fashion as long as the USB receive FIFO 302 is not full. If it is determined that the USB transmit FIFO 300 is full in step 701, then control proceeds to step 704. In step 704, it is detected whether the end of a USB packet has been reached. If so, then control proceeds to step 706. In step 706, a header of the USB transmit FIFO 300 is updated to reflect the status of the current USB packet before proceeding to the next USB packet. This operation also may be performed before a next request by the USB host 218 or USB device 74, whichever is applicable. If it is determined in step 704 that the end of a USB packet has not been reached, then control proceeds to step 700.

Providing a USB controller with a DMA mode in accordance with the present invention allows for a reduction in the buffer size of USB FIFOs supported by USB endpoints. A DMA mode of a USB controller also permits back to back USB packets to be handled without processor intervention. In accordance with the present invention, a USB device having a USB controller with a DMA mode can handle USB data as fast as the USB host can request or provide data.

The present invention is particularly useful for transfer of I/O request packets (IRPs). For example, IRPs may be stored in a single USB buffer. When the USB host 218 requests data, direct memory access transfers data to the host 218, up to the maximum packet size defined by the Universal Serial Bus Specification. The particular message is terminated at this maximum packet size. When the host 218 next requests data, data is transferred through direct memory access within the same IRP at the point where the previous message was terminated.

The foregoing disclosure and description of the invention are illustrative and explanatory thereof, and various changes in the number of bits, number of signals, order of steps, field sizes, connections, components, and materials, as well as in the details of the illustrated hardware and construction and method of operation may be made without departing from the spirit of the invention.

We claim:

1. A universal serial bus (USB) device for USB transfer with direct memory access (DMA), comprising:
   a DMA controller, comprising:
      a plurality of DMA channels for performing data transfer between the USB device and a USB host; and
   a USB controller having a DMA mode, comprising:
      a plurality of USB endpoints, each selectively programmed for one of the plurality of DMA channels during the DMA mode of the USB controller.

2. The USB device of claim 1, each of the plurality of DMA channels having a DMA transmit channel, each of the plurality of USB endpoints comprising:
   a USB transmit endpoint selectively programmed for the DMA transmit channel of one of the plurality of DMA channels during the DMA mode of the USB controller.

3. The USB device of claim 2, the USB transmit endpoint comprising:
   a USB transmit buffer for storing USB data to be provided to the USB host.

4. The USB device of claim 3, wherein the DMA transmit channel issues a DMA request if the USB transmit buffer is not full.

5. The USB device of claim 1, each of the plurality of DMA channels having a DMA receive channel, each of the plurality of USB endpoints comprising:
   a USB receive endpoint selectively programmed for the DMA receive channel of one of the plurality of DMA channels during the DMA mode of the USB controller.

6. The USB device of claim 5, the USB receive endpoint comprising:
   a USB receive buffer for storing USB data from the USB host.

7. The USB device of claim 6, wherein the DMA receive channel issues a DMA request if the USB receive buffer is not empty.

8. The USB device of claim 1, each of the plurality of DMA channels comprising:
   a DMA receive channel for handling data transfer from the USB host during the DMA mode of the USB controller.

9. The USB device of claim 1, each of the plurality of DMA channels comprising:
   a DMA transmit channel for performing data transfer to the USB host during the DMA mode of the USB controller.

10. The USB device of claim 1, the DMA controller further comprising:
    at least one DMA control register configured to select each of the plurality of USB endpoints as a source for data to be provided to the USB host.

11. The USB device of claim 1, wherein the USB controller and DMA controller are integrated into the USB device.

12. The USB device of claim 1, wherein the USB device is a microcontroller.

13. A universal serial bus (USB) host for USB transfer with direct memory access (DMA), comprising:
    a DMA controller, comprising:
       a plurality of DMA channels for performing data transfer between the USB host and a USB device; and
    a USB controller having a DMA mode, comprising:
       a plurality of USB endpoints each selectively programmed for one of the plurality of DMA channels during the DMA mode of the USB controller.

14. The USB host of claim 13, each of the plurality of DMA channels having a DMA transmit channel, each of the plurality of USB endpoints comprising:
    a USB transmit endpoint selectively programmed for the DMA transmit channel of one of the plurality of DMA channels during the DMA mode of the USB controller.

15. The USB host of claim 14, the USB transmit endpoint comprising:
    a USB transmit buffer for storing USB data to be provided to the USB device.

16. The USB host of claim 15, each of the plurality of DMA channels having a DMA transmit channel, wherein the DMA transmit channel issues a DMA request if the USB transmit buffer is not full.

17. The USB host of claim 13, each of the plurality of DMA channels having a DMA receive channel, each of the plurality of USB endpoints comprising:
a USB receive endpoint selectively programmed for a DMA receive channel of one of the plurality of DMA channels during the DMA mode of the USB controller.

18. The USB host of claim 17, the USB receive endpoint comprising:
a USB receive buffer for storing USB data from the USB device.

19. The USB host of claim 18, wherein the DMA receive channel issues a DMA request if the USB receive buffer is not empty.

20. The USB host of claim 13, each of the plurality of DMA channels comprising:
a DMA receive channel for handling data transfer from the USB device during the DMA mode of the USB controller.

21. The USB host of claim 13, each of the plurality of DMA channels comprising:
a DMA transmit channel for performing data transfer to the USB device during the DMA mode of the USB controller.

22. The USB host of claim 13, the DMA controller further comprising:
at least one DMA control register configured to select each of the plurality of USB endpoints as a source for data to be provided to the USB device.

23. The USB host of claim 13, wherein the USB controller and DMA controller are integrated into the USB host.

24. The USB host of claim 13, wherein the USB host is a computer system.

25. A universal serial bus (USB) controller having a direct memory access (DMA) mode, comprising:
a plurality of USB endpoints, each selectively programmed for one of a plurality of DMA channels during the DMA mode of the USB controller.

26. The USB controller of claim 25, each of the USB endpoints comprising:
a USB transmit endpoint selectively programmed for one of a plurality of DMA transmit channels of an internal DMA controller during the DMA mode of the USB controller.

27. The USB controller of claim 26, the USB transmit endpoint comprising:
a USB transmit buffer for storing USB data to be transmitted from the USB controller.

28. The USB controller of claim 26, wherein the USB transmit endpoint is configured for the DMA transmit channel.

29. The USB controller of claim 25, each of the plurality of USB endpoints comprising:
a USB receive endpoint selectively programmed for one of a plurality of DMA channels during the DMA mode of the USB controller.

30. The USB controller of claim 29, the USB receive endpoint comprising:
a USB receive buffer for storing USB data received by the USB controller.

31. The USB controller of claim 29, wherein the USB receive endpoint is configured for the DMA receive channel.

32. A method of transferring data from a receive endpoint of a universal serial bus (USB) controller using direct memory access (DMA), the receive endpoint having a receive buffer, comprising the steps of:
programming the receive endpoint to use one of a plurality of DMA channels;
issuing a direct memory access request if the receive buffer is not empty; and
issuing direct memory access requests until the receive buffer is empty.

33. The method of claim 32, further comprising the step of:
programming a maximum packet size of USB data for transfer by the receive endpoint to a value greater than a physical size of the receive buffer.

34. The method of claim 32, further comprising the step of:
transferring USB data from the receive buffer responsive to a direct memory access request.

35. The method of claim 34, further comprising the step of:
updating a header of the receive buffer with a status of the USB data transferred if an end of a USB packet is detected.

36. The method of claim 32, wherein the receive endpoint is programmed for a direct memory access receive channel.

37. A method of transferring data to a transmit endpoint of a universal serial bus (USB) controller using direct memory access (DMA), the transmit endpoint having a transmit buffer, comprising the steps of:
programming the transmit endpoint to use one of a plurality of DMA channels;
issuing a direct memory access request if the transmit buffer is not full; and
issuing direct memory access requests until the transmit buffer is full.

38. The method of claim 37, further comprising the step of:
programming a maximum packet size of USB data for transfer to the transmit endpoint to a value greater than a physical size of the transmit buffer.

39. The method of claim 37, further comprising the step of:
transferring USB data to the transmit buffer responsive to a direct memory access request.

40. The method of claim 39, further comprising the step of:
updating a header of the transmit buffer with a status of the USB data transferred if an end of a USB packet is detected.

41. The method of claim 37, wherein the transmit endpoint is programmed for a direct memory access transmit channel.

* * * * *